United States Patent [19]

Dwyer et al.

[11] Patent Number: 4,794,474

[45] Date of Patent: Dec. 27, 1988

[54] CUE SIGNALS AND CUE DATA BLOCK FOR USE WITH RECORDED MESSAGES

[75] Inventors: John J. Dwyer, Stratford; David B. Chamberlin, Milford; Emil F. Jachmann, Greenwich, all of Conn.

[73] Assignee: Dictaphone Corporation, Stratford, Conn.

[21] Appl. No.: 894,582

[22] Filed: Aug. 8, 1986

[51] Int. Cl.4 .................. G11B 27/38; G11B 15/18
[52] U.S. Cl. ................................... 360/72.2; 360/27
[58] Field of Search .................. 360/27, 72.2, 72.1, 360/72.3, 71, 74.4; 369/27–29

[56] References Cited

U.S. PATENT DOCUMENTS

| | | |
|---|---|---|
| 3,433,428 | 3/1969 | Schatteman . |
| 3,467,790 | 9/1969 | Bolick . |
| 3,635,424 | 1/1972 | Morello . |
| 3,758,726 | 9/1973 | Bolick . |
| 3,779,498 | 12/1973 | Takashino . |
| 3,823,388 | 7/1974 | Chadima . |
| 3,834,651 | 9/1974 | Hashizume . |
| 3,842,433 | 10/1974 | Lemelson . |
| 3,879,586 | 4/1975 | DuRocher . |
| 3,885,108 | 5/1975 | Zock . |
| 3,896,493 | 7/1975 | Ando . |
| 3,903,369 | 9/1975 | Darwood . |
| 3,914,551 | 10/1975 | Hunt . |
| 3,916,121 | 10/1975 | Stuzzi . |
| 3,920,926 | 11/1975 | Lenaerts . |
| 4,007,491 | 2/1977 | Bolick . |
| 4,057,839 | 11/1977 | Banks . |
| 4,115,846 | 9/1978 | Laine . |
| 4,212,438 | 5/1978 | Schatteman . |
| 4,221,938 | 8/1980 | Mohammadioun et al. ..... 179/100.1 |
| 4,224,644 | 9/1980 | Lewis et al. ..................... 360/72.2 |
| 4,263,481 | 4/1980 | Ho et al. ............................ 179/6.14 |
| 4,291,198 | 6/1980 | Anderson . |
| 4,306,117 | 1/1982 | Jacobson . |
| 4,317,143 | 11/1982 | Osanai . |
| 4,377,825 | 3/1983 | Kasubuchi et al. ................. 360/48 |
| 4,378,917 | 1/1980 | Negishi . |
| 4,410,923 | 10/1983 | Patel .................................. 360/72.3 |
| 4,422,114 | 6/1981 | Sugihara . |
| 4,425,627 | 2/1981 | Eibner . |
| 4,482,085 | 1/1983 | Tanaka . |
| 4,524,244 | 8/1983 | Faggin . |
| 4,663,678 | 5/1987 | Blum ................................. 360/72.2 |

OTHER PUBLICATIONS

Cygnet Communications CoSystem.
The Zymacom Information Exchange.

Primary Examiner—A. J. Heinz
Attorney, Agent, or Firm—Robert H. Whisker; Melvin J. Scolnick; David E. Pitchenik

[57] ABSTRACT

A dictation/transcription system wherein identifying signals are recorded with audio messages. One of at least two different types of identifying signals, such as single or double bursts of cue tones, together with a block of digital data are recorded. The digital data block is comprised of fields of data for providing additional message identifying information, such as message type, time and date of recording, author identification and the location of the message on the record medium.

38 Claims, 7 Drawing Sheets

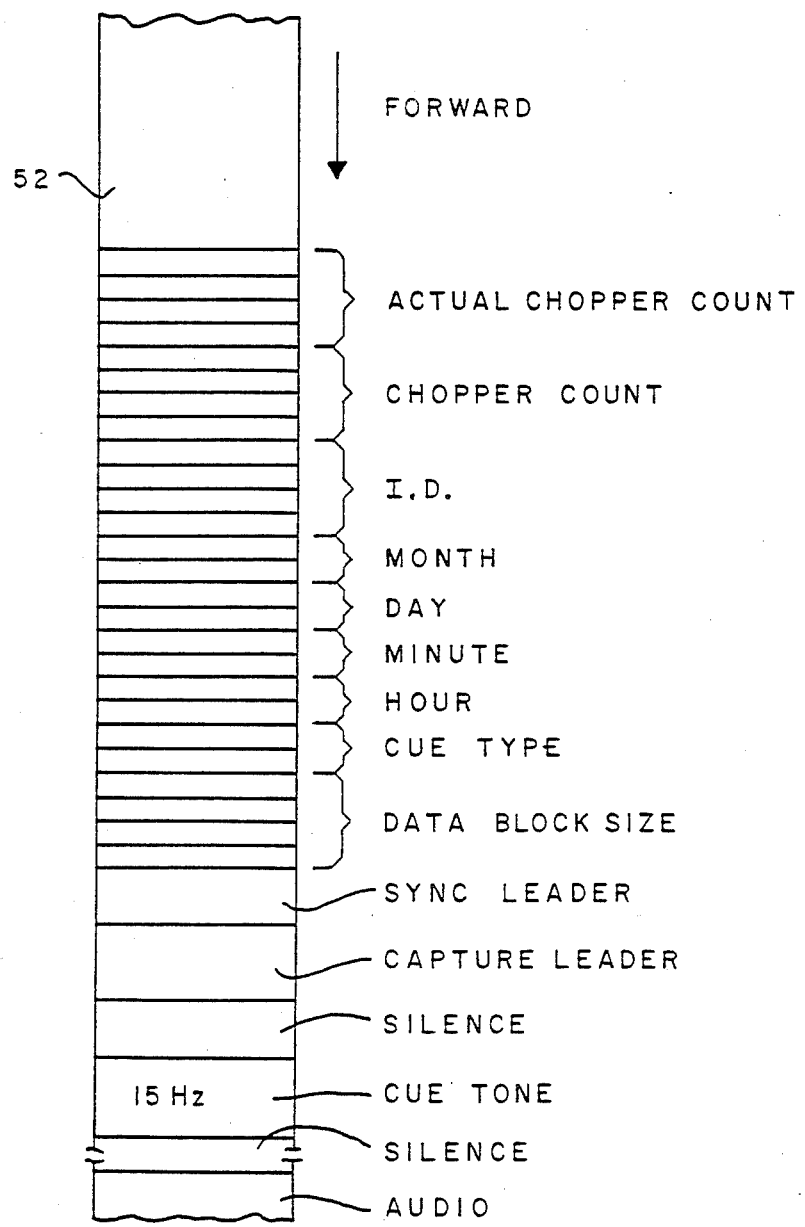

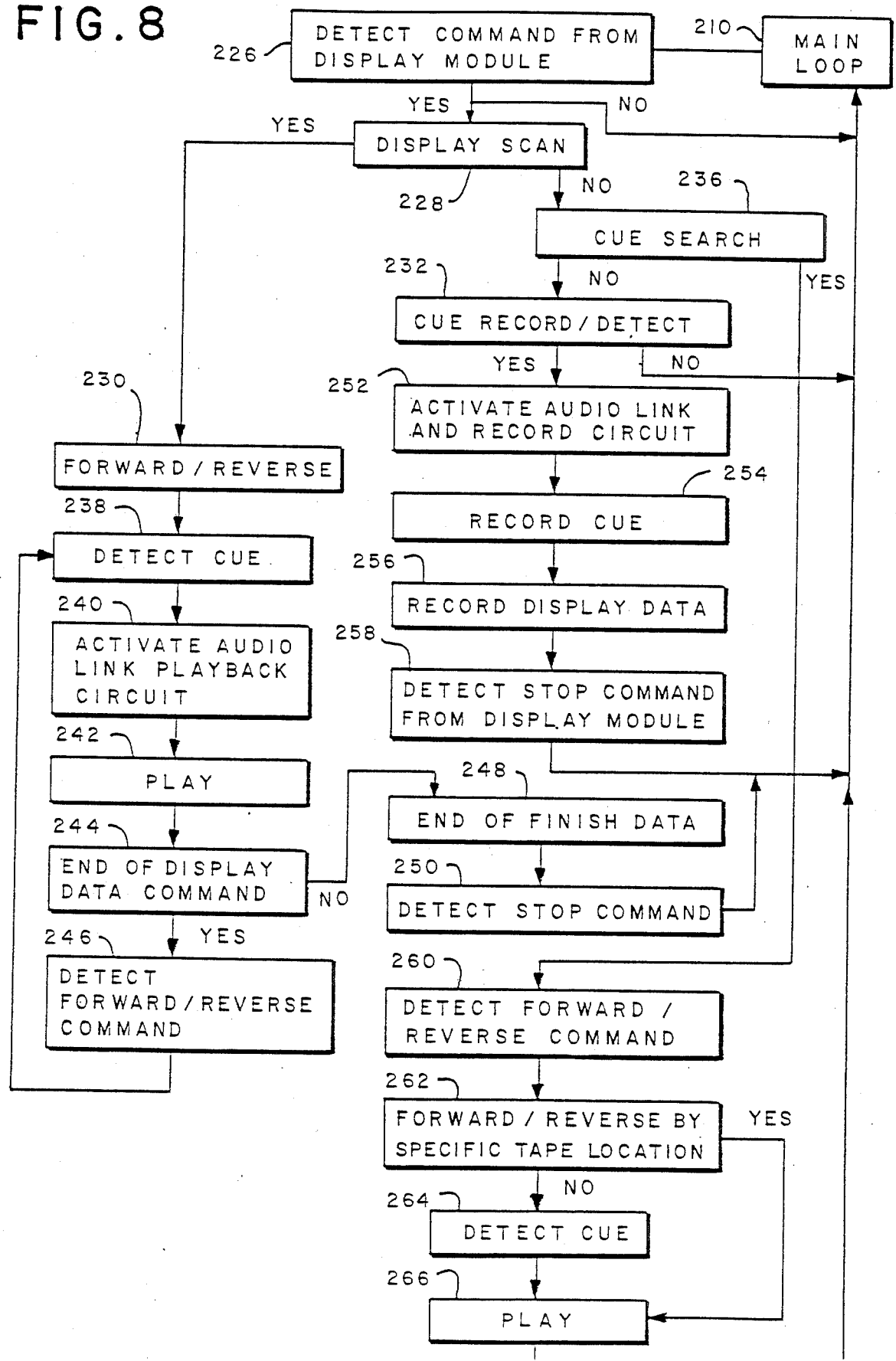

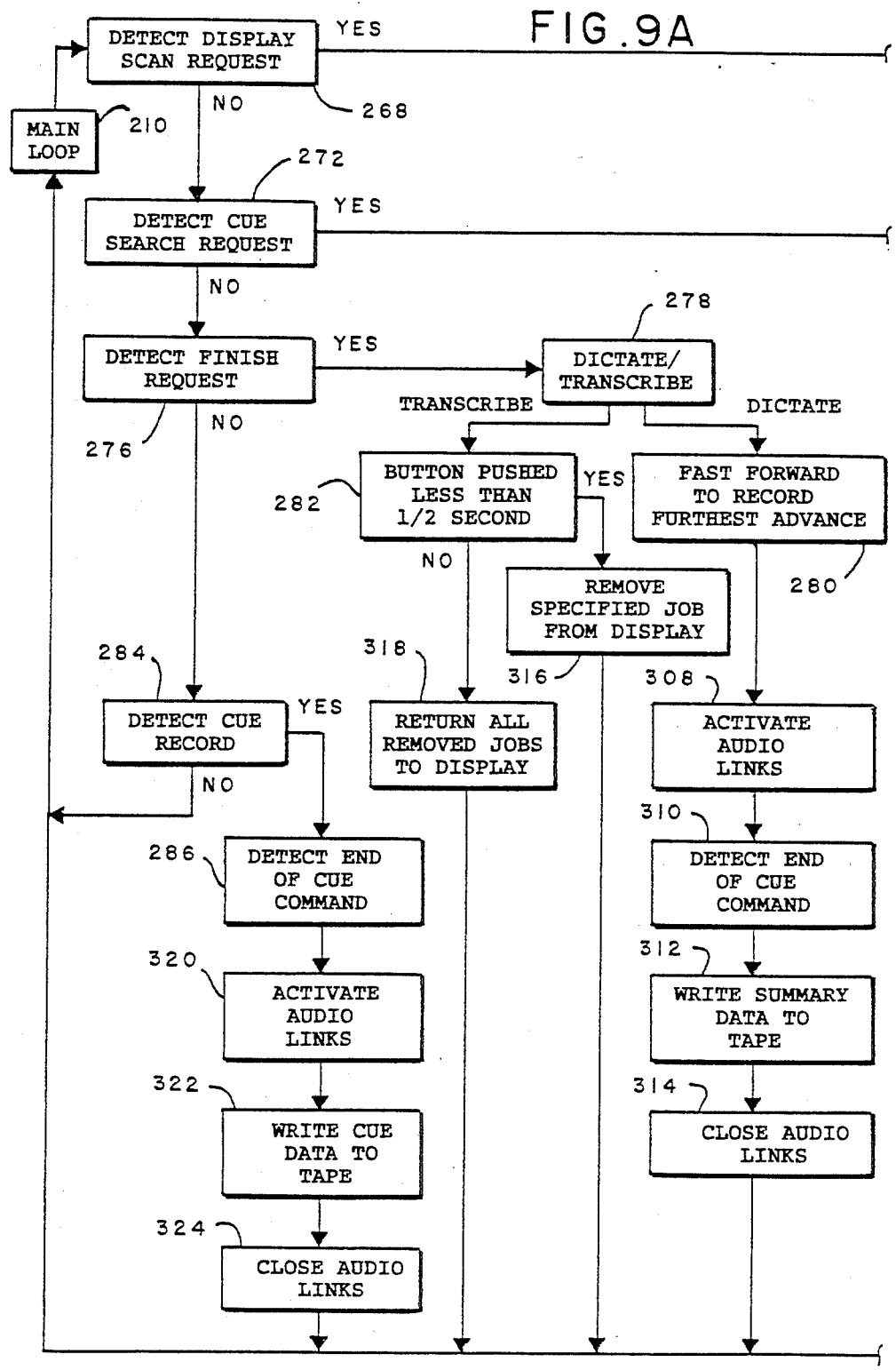

CUE SIGNALS AND CUE DATA BLOCK FOR USE WITH RECORDED MESSAGES

BACKGROUND OF THE INVENTION

I. Field of the Invention

This invention relates to dictation/transcription systems for the recording and retrieval of messages such as voice signals on a recording medium and, more particularly, to a dictation/transcription system wherein message identifying information in the form of tone signals and message identifying data blocks are also recorded on and retrieved from the recording medium. The message identifying information rerieved during transcription enables the system to determine and display the number and variety of message types recorded on the medium.

II. Description of the Prior Art

A variety of dictation/transcription equipment is presently available which provide for the recording of voice messages and the subsequent playback of those messages for transcription. In the field of dictation/transcription equipment, however, a long standing problem relates to the differentiation and identification of the variety of message types which may be present on the message recording medium, such as magnetic tape. These message types may relate to, for example, letters or "priority" letters, or instructions or "special" notes which the dictator wishes to convey to the transcriber. As may be appreciated, the use of dictation/transcription equipment within various work environments, such as a hospital, may further require other, specialized message types. For example, within a hospital environment it may be desirable for the transcriptionist to differentiate between not only conventional message types, such as those described above, but also specialized message types relating to patient charts, orders for medication, and requests for various diagnostic tests. As may be further appreciated, another desirable feature of dictation/transcription equipment is the ability to display the number, the locations and the different types of messages present on the recording medium and, further, to rapidly position the medium at a desired message.

Currently available dictation/transcription devices of particular interest include two models marketed by Dictaphone Corporation, the assignee of the present invention, namely the DCX II and the DCX III machines. Both of these devices record a tone, or cue, as a marker to identify a segment of dictation, for example, a letter. One type of cue has the form of a one second burst of tone, typically, 15 Hertz (HZ) signal which is recorded when the operator depresses a CUE button on a hand-held microphone. A second type of cue has the form of two one second bursts separated by one half second of silence. By convention, the single burst cue is recorded to mark the end of a dictated letter, while the double burst cue is recorded to mark the beginning of a dictated instruction to the transcriptionist. Thus, it may be seen that these two message types may be differentiated by the association of a particular type of cue with a segment of dictation.

In addition, both the DCX II and the DCX III have a visual display comprised of a linear array of light emitting diode (LED) segments which are illuminated to indicate to the transcriber the relative locations on the tape of the cues. The display of the DCX II device indicates the positions of the letter cues, while the display of the DCX III device indicates both letter and instruction cues and other message related information, such as the duration of the segment of dictation.

The information displayed by each DCX device is created in response to the depression of a scan switch by the transcriptionist. An internal microprocessor responds to the actuation of the scan switch to cause the tape to be quickly moved past a record/playback head. As the tape is driven, the recorded single and double burst cue signals are detected, while chopper pulses are generated as the usual supply or take-up reel rotates to transport the tape. By linearizing the intervals between such chopper pulses, the microprocessor computes the relative position of the tape and, hence, associates a tape position with a detected cue. The type and position of each detected cue are stored in a memory and also indicated on the LED display for viewing by the transcriptionist. Additionally, the DCX devices also are provided with a search switch which, when actuated, commands the microprocessor to drive the tape in a rapid manner to the beginning of each recorded instruction message, the positions of the instruction messages having been identified by the microprocessor during the aforementioned scan operation.

Another example of dictating/transcription equipment which provides for recording a marker tone is shown in U.S. Pat. No. 4,468,751. This patent describes a central dictating and transcription system having a plurality of dictating and transcribing stations in which voice signals are converted to digital signals by an analog-to-digital converter for storage as speech data records on a rotating disk storage device. During transcription, the stored data records are reconstituted into speech by a digital-to-analog converter. Also recorded is a tone followed by a data code which directs the playback operation to "jump" from one speech data record to another during transcription. This "jumping" from data record to data record permits the dictator to make insertions or deletions in his dictated messages. The data code directs the digital apparatus to access non-sequentially stored speech records (e.g., the inserted records) but supplies the transcriptionist with a continuous flow of speech.

U.S. Pat. No. 3,869,720 also describes the generation of multiple tones in a magnetic tape dictation indexing system. Multiple record and playback heads operate on separate tracks of a record tape; and each tone has a unique frequency that is recorded on a separate track. However, codes are not associated with the tones.

SUMMARY AND OBJECTS OF THE INVENTION

It is an object of the present invention to provide a dictation/transcription system which records and plays back audio messages together with message identifying tones and, additionally, digital identifying data such as an associated message identification data block.

Another object of the present invention to provide a dictation/transcription system of the aforementioned type wherein the data block identifies a preceding tone (or tones) as being associated with a letter, a "priority" letter, an instruction, or a "special" note.

A further object of the present invention is to provide a dictation/transcription system of the aforementioned type wherein the data block identifies a preceding tone (or tones) as being associated with any one of at least four different types of messages.

An additional object of the present invention is to provide a dictation/transcription system of the aforementioned type wherein the data block conveys other information relating to the associated message, such as an author identification, the time and date the message was recorded, and other similar information useful to a transcriptionist.

Yet another object of the present invention is to provide a dictation/transcription system of the aforementioned type wherein the data block comprises a "finish" data block which identifies the preceding tone as a "finish" tone, and which includes summary data that summarizes types and locations of the messages recorded on the recording medium.

A still further object of the present invention is to provide a dictation/transcription system of the aforementioned type wherein a microprocessor utilizes the digital data block to compute the location of a desired type of message such that the recording medium may be rapidly repositioned thereto.

Anther object of the present invention is to provide a dictation/transcription system capable of recording and playing back cue tones so as to be "backwards compatible" with prior systems which utilize such tones for the identification of letter and instruction messages. Examples of such systems, which are in wide use, are the aforementioned DCX II and DCX III dictation/transcription systems.

In one embodiment of the present invention message identifying tones, known as cues, are selectively recorded on a magnetic recording tape in response to the actuation of a cue switch. A microprocessor controls the recording of the cue and also the serial-bit writing of a digital data block which, preferably, is recorded by a Frequency Shift Keying (FSK) modulator circuit.

During playback, a FSK demodulator circuit converts the FSK frequencies to digital representations for input to the microprocessor. The microprocessor stores in a memory the recovered digital data, thereby building a table which is descriptive of the types of locations of the messages recorded on the tape. This information is displayed to a transcriptionist following a high speed forward or reverse tape scan.

The techniques of recording cue tones followed by a digital data block of identifying information permits an additional "finish" cue tone to be recorded at the completion of a session of dictation. This finish cue tone is associated with a summary data block which contains digital data that summarizes the entire contents of the stored table, thus allowing the microprocessor, during playback of the summary data block, to quickly determine and display the message content of the tape.

BRIEF DESCRIPTION OF THE DRAWING

The following description, taken by way of example, is best understood in conjunction with the accompanying drawings wherein:

FIG. 7 is a schematic representation of a data block of digital message identifying data recorded on the record tape of FIG. 6;

FIG. 8 is a flow chart representing the relevant operation of the microprocessor included in the recording/playback module to record and detect display data; and FIGS. 9A and 9B is a flow chart of the relevant operation of the microprocessor included in the display module for controlling the operation of and interaction with the recording/playback module.

DETAILED DESCRIPTION OF THE INVENTION

In order to facilitate an understanding of the present invention, reference will herein be made to a specific embodiment thereof incorporated into a modular desktop dictation/transcription system. It should be realized, however, that this invention is well suited for use with a variety of dictation/transcription systems, such as desktop systems of unitary construction, or portable hand-held systems, and even central dictation systems. Likewise, although the preferred embodiment of this invention is described herein as utilizing specifically ordered digital data words having certain characteristics, such as the number and ordering of the bits of data therein, it should be realized that a variety of other data formats, utilizing a variety of data representation schemes may be used.

Figure 1:
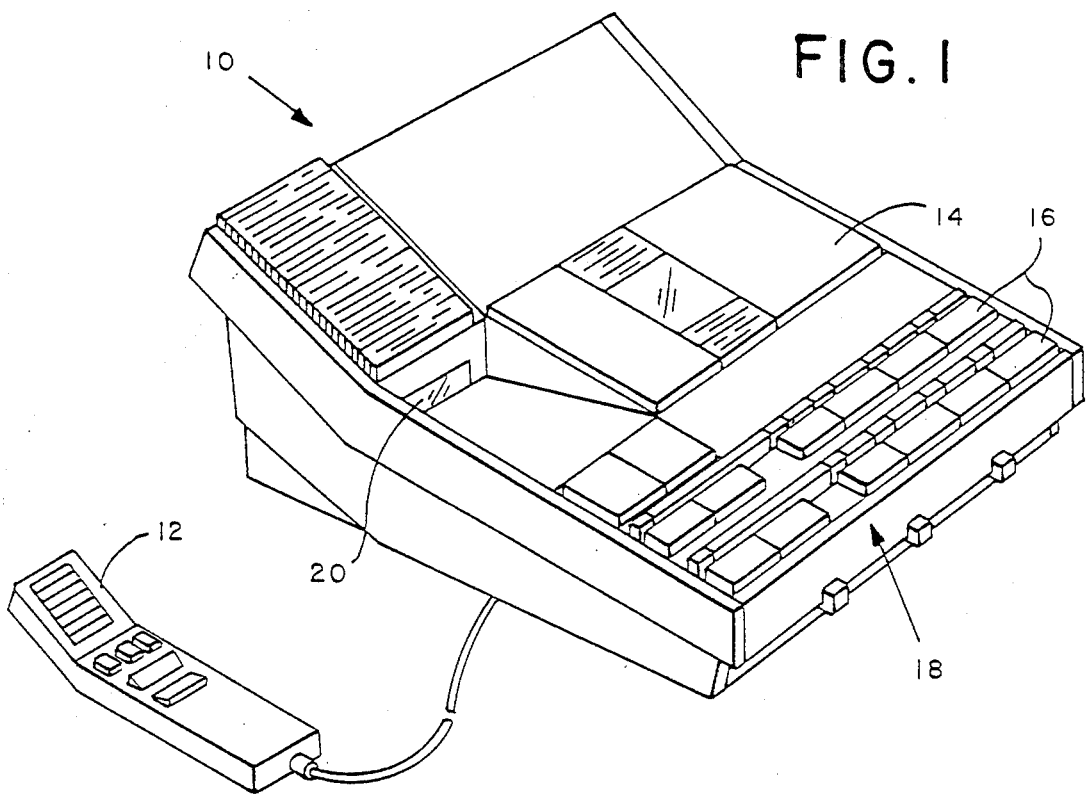
FIG. 1 shows a stylized view of a recording/playback device adapted for interconnection with a modular display unit in accordance with the present invention.
Figure 2:
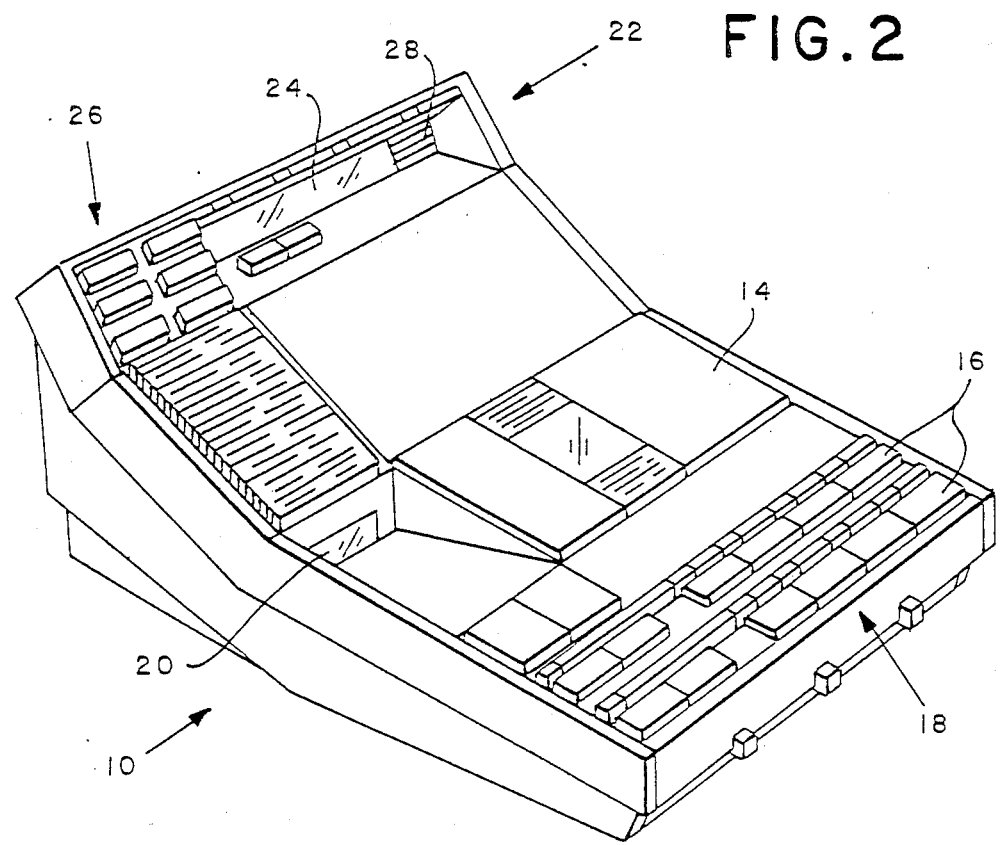
FIG. 2 shows the dictation/transcription device of FIG. 1 connected to a display module for providing additional functions useful for dictation and transcription.

With reference to FIGS. 1 and 2, there are shown, respectively, a recording/playback device 10, and the recording/playback device electrically connected to a display device 22 incorporating the present invention. These devices are more fully described in copending application Ser. No. 895,006, Filed: Aug. 8, 1986, Titled: MODULAR DICTATION/TRANSCRIPTION SYSTEM (DIC-527) and assigned to the assignee of the present invention, the disclosure thereof being incorporated herein by referene. The display device and the recording/playback device may be combined in a single unitary construction, or may be constructed in modular form in which the recording/playback device and the display device may be connected to each other, and disconnected from each other, as may be desired to provide for a display of recording-playback functions. By way of example, the following description is directed to a modular form of the recording/playback device and the display device, it being understood that the present invention is equally applicable to a unitary construction of the recording/playback device and the display device.

The recording/playback device is shown in FIG. 1 as a module 10 which is operable as a stand-alone unit for the recording and playback of sound, particularly voice. A microphone 12 is shown connected to the module 10 for use by personnel to record a spoken message on a recording medium such as magnetic tape within a cassette (not shown in FIG. 1) located within a compartment 14. Push buttons 16 of a keyboard 18 are operably connected with a tape transport (not shown in FIG. 1)

for advancement and rewind of the tape. The module 10 includes a display 20 which, for example, provides a numerical read-out of present position of the tape.

FIG. 2 shows a display module 22 which may be connected to the recording/playback module 10 to present additional information relating to dictation and transcription functions, as more fully described in, for example, copending application Ser. No. 894,993, Filed: Aug. 8, 1986, Titled: DISPLAY FOR MODULAR DICTATION/TRANSCRIPTION SYSTEM (DIC-526) and assigned to the assignee of the present invention, and whose disclosure is incorporated herein by reference. For example, the display module 22 presents a plurality (preferably three) of bar graph displays composed of individual segments of visual indicators such as LED's, LCD's or the like which appear as display 24. Preferably, the display 24 is constructed as a liquid crystal display (LCD), with the aforementioned segments appearing as dark segments on a light background though, if desired, the display may present the segments as lighted segments on a dark background.

Successive segments form blocks which have lengths proportional to recorded messages such as letters, memos, and reports. The segments in a block may be made to flash to indicate a "priority" item which is to be typed immediately by a transcriptionist. Additional useful information is presented in alphanumeric form in a region 28 on the right side of the display 24, such as the identification of the author who dictated a message and the length (in minutes) of the message. The date and time of message creation is displayed in the display 20 of module 10.

Figure 3:
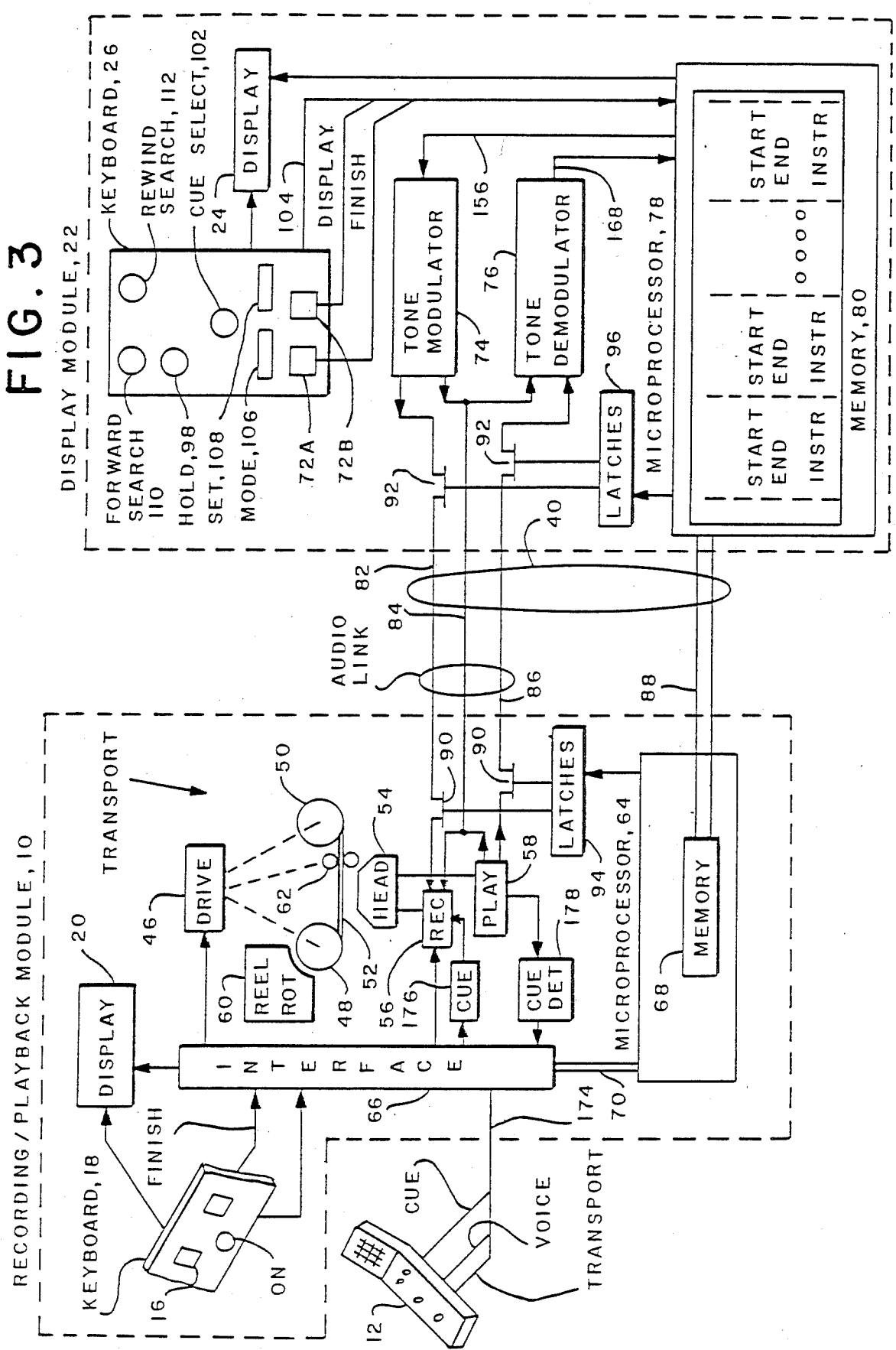
FIG. 3 is an electrical block diagram of the modular interconnected system of FIG. 2.

FIG. 3 is a block diagram of electrical circuitry of the two modules 10 and 22. The recording/playback module 10 comprises a drive 46 for rotating a supply reel 48 and a take-up reel 50 to transport a magnetic recording tape 52 past a recording/playback head 54 for the storing and retrieval of audio and display data signals on the tape. The module 10 further comprises a recording circuit 56 and a playback circuit 58 which connect with the head 54, and a rotation detector 60 which is positioned alongside the supply reel 48, for example, for detecting rotation thereof. A capstan 62 is operated by the drive 46 for maintaining a constant speed of travel of the tape 52 during record and playback operation. As the tape 52 unwinds from the supply reel 48, the effective diameter of the supply reel 48 becomes smaller causing its rotational speed to increase in view of the constant linear speed of the tape 52 driven by the capstan 62. Therefore, the detector 60 detects a continuously increasing rate of rotation during forward motion of the tape 52.

As shown in FIG. 3, the connection of the microphone 12 to the module 10 is accomplished via the interface unit 66, the connection being shown as a set of lines including a line for the cue signal, a line for voice communication, and a line for signals controlling transport motion such as forward, fast-forward and fast-rewind. The voice line from the microphone 12 is understood to include conductors for transmission of signals from the microphone to the recording circuit 56 and for playback of signals from the playback circuit 58 via a small speaker (not shown) within the microphone 12. The cue signal line activates an oscillator 176 to generate the message identifying cue signal which is supplied via the recording circuit 56 to the head 54.

The recording/playback module 10 also includes a microprocessor 64, which applies control signals via an interface unit 66 to the display 20, the drive 46, the recording circuit 56 and the playback circuit 58. Rotation signals in the form of motion pulses are produced by the rotation detector 60, and are coupled via the interface unit 66 to the microprocessor 64. The microprocessor counts these pulses to provide a pulse count (also referred to as a tape count) representing the position of the tape at any given time. A memory 68 coupled to the microprocessor 64 stores program data and other information useful in the operation of the microprocessor 64.

Digital signals are coupled between the interface unit 66 and the microprocessor 64 by a data bus 70. The interface unit also supplies signals from the keyboard 18 (partially shown in FIG. 3) to the microprocessor which, in turn, controls display 20 and selects the operational functions of the module 10 and also of the module 22.

A "finish" pushbutton 72A on the display module 22 provides a signal indicating that an author has finished his dictation. This signal initiates an operation in the modules 10 and 22 by which a complete history of the types of recorded messages, their locations and their author(s) are recorded on the tape 52 as a digitally formatted message placed alongside the audio information, or dictation, that also is recorded on the tape. Another pushbutton 72B on the display module 22 may be activated by an operator to command the display module 22 to display this recorded history on the display 24, preferably in bar graph form as mentioned above.

In a preferred embodiment of the invention, the presentation on the display 24 develops as the author dictates into the microphone 12 and tape 52 advances. One segment of the bar graph display is energized by way of example, for each 30-second interval of dictation. A graph length of ten segments would indicate, in the foregoing example, a dictation time of five minutes. The author indicates the end of a dictated passage, memo or report by pressing a cue button on the microphone 12. This end-of-dictation is represented by the omission of a segment (i.e., the segment is not energized) and the properly de-energized segment is determined as a function of the number of motion pulses that have been generated by rotation detector 60 of the recording/playback module 10. Pressing the cue button also activates the modules 10 and 22 to store the end of dictation point of the dictated material on the recording tape 52, as well as the author's identification point of initial dictation, time and date of dictation of that particular message. Also, when the cue button first is activated, the original starting point at which dictation on the tape commenced is stored. This display data for all recorded messages is recorded on the recording tape 52 in the form of a summary block of data in response to the operation of "finish" button 72A. At a later time, after a power failure, for example, when modules 10 and 22 are subsequently reactivated, or if the tape is transferred to another similar system, the display module 22 can regenerate the graphical display from the display data stored on the recording tape 52 upon command from the pushbutton 72B.

By way of example, the message-related display data that is transferred between modules 10 and 22 is in the form of a sequence of audio tone signals. In order to produce and recover these tone signals, the display module 22 includes a tone modulator 74, a tone demodulator 76 and a microprocessor 78, in addition to the aforementioned display 24 and a keyboard 26. The microprocessor 78, which may be an NEC Model 7500, or similar device, includes a memory 80 for storing program data and the aforementioned display data.

A connector 40 interconnects the two modules 10 and 22 and comprises an audio link composed of lines 82, 84 and 86, and a digital data bus 88. The bus 88 couples digitally formatted signals between the two microprocessors 64 and 78. The line 82 couples audio signals from the tone modulator 74 to the recording circuit 56. The line 86 couples audio signals from the playback circuit 58 to the tone demodulator 76. The line 84 is a return line for the signals on both lines 82 and 86. Analog switches 90 in the form of field effect transistors (FET's) in the recording/playback module 10, and analog switches 92 in the form of FET's in the display module 22 permit either of hhe modules 10 and 22 to be connected and disconnected from the audio lines 82 and 84. The switches 90 are operated by the microprocessor 64 via latches 94. The switches 92 are operated by the microprocessor 78 via latches 96.

If desired, the audio link can be extended to enable the connection of the audio lines of the display module 22 to a further recording/playback module (not shown), together with a concomitant extension of bus 88. Thereby, the display module 22 may be adapted to function with two recording/playback modules. In such adaptation, as described in copending application Ser. No. 894,583, Filed: Aug. 8, 1986, Titled: DISPLAY FOR MODULAR DICTATION/TRANSCRIPTION SYSTEM (DIC-528) the memory 80 of the display module 22 stores display data supplied from both recording/playback modules.

Keyboard 26 of the display module 22 includes a hold button 98, a cue select button 102, a FORWARD SEARCH button 110 and a REWIND SEARCH button 112. These buttons are electrically connected via line 104 to the microprocessor 78 for selecting operating functions of the microprocessor. The hold button 98 is useful in retaining a presentation on the display 24. The cue select button 102 is useful during transcription because it allows an operator to select a type of message to be accessed such as a letter, a "priority" letter, an instruction or a "special" note. Recorded messages are characterized as one of the foregoing types by operating the cue buttons 13 on microphone 12, and a specific cue designation is recorded on the tape 52 (along with other data, such as the author's identification, point of initial dictation, the date, the time, and the end point of the message). In one particularly advantageous embodiment of the display module 22, each message type (or cue designation) may be selectively displayed (or alternatively highlighted) along the bottom edge of the display 24; and the cue designations are selected in sequence by successive pushing of the cue select button 102.

When tape 52 moves past the head 54, a cursor indicating the tape position, moves along the display 24 in the horizontal direction to show the tape position. The cursor may appear as a dark or light square positioned beneath the array of segments of the "letter" display graph on the display 24.

Information such as the author identification, the date and the time of dictation can be entered by use of two pushbuttons 106 and 108 referred to, respectively, as the mode button and the select button on keyboard 26. If desired, these buttons may be concealed from view and from inadvertent operation. The mode and select buttons 106 and 108 are operatively connected via the line 104 to the microprocessor 78 for entering and storing the foregoing information. Such information can be entered conveniently by pressing the mode button 106 successively for selecting author identification, the date, and the form of time (12 hour or 24 hour clock) to be entered. The select button 108 is pressed to cycle through the numerals of the author identification, the time and date. This data also is recorded from microprocessor 78 onto tape 52.

Further details of the circuity of FIG. 3 will now be described with reference to FIGS. 4–6 followed by the flow charts of FIGS. 8–9A and 9B.

Figure 4:
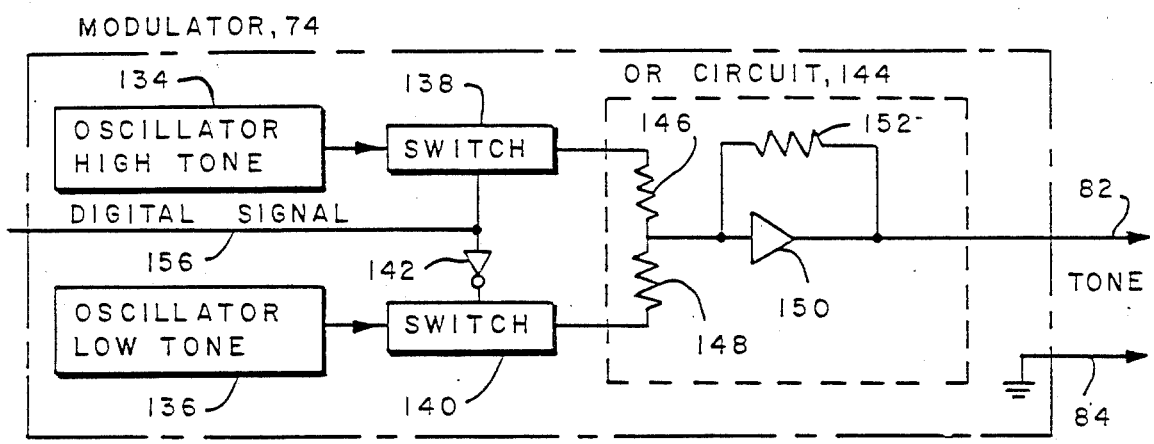
FIG. 4 shows one embodiment of a tone modulator that may be used in the display module shown in FIG. 3.

With reference to FIG. 4, the tone modulator 74 comprises two oscillators 134 and 136, two switches 138 and 140, a digital inverter 142 and an OR circuit 144. The OR circuit 144 comprises two summing resistors 146 and 148, and an amplifier 150 with a feedback resistor 152. In operation, the oscillator 134 produces a higher frequency tone signal (e.g., 1800 Hz) and the oscillator 136 produces a lower frequency tone signal (e.g., 1000 Hz). These signals are coupled by the switches 138 and 140 to the OR circuit 144 to be outputted on the audio line 82 (FIG. 3) as FSK (frequency shift keying) signals. A digital signal applied by the microprocessor 78 via line 156 to the switches 138 and 140 operates those switches to connect one or the other of oscillators 134 and 136 to OR circuit 144. The inverter 142 provides for alternate operation of the switches 138 and 140 such that a logic-1 signal on line 156 operates the switch 138 to output a high frequency tone on line 82, and a logic-0 signal on line 156 operates the switch 140 to output a low frequency tone on the line 82.

In the OR circuit 144, the summing resistors 146 and 148 couple signals respectively from the switches 138 and 140 to the negative input terminal of the amplifier 150. Thereby, the modulator 74 converts the digital signal on line 156 to audio tone FSK signals on line 82.

Figure 5:
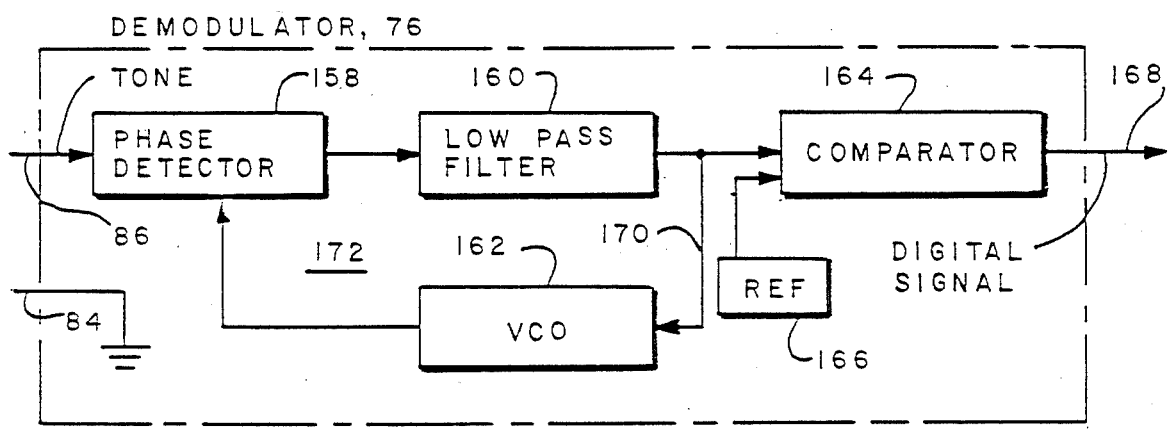
FIG. 5 shows one embodiment of a tone demodulator that may be used in the display module shown in FIG. 3.

FIG. 5 shows details of the tone demodulator 76, the demodulator comprising a phase detector 158, a low-pass filter 160, a voltage controlled oscillator 162, a comparator 164, and a source 166 of a reference signal for the comparator 164. The audio tone signal on line 86 (FIG. 3) is applied to an input terminal of the phase detector 158. The comparator 164 produces a digital signal which is applied via line 168 to the microprocessor 78 (FIG. 3).

In operation, the oscillator 162 oscillates at a frequency dependent on the amplitude of a signal outputted by the filter 160 via line 170 to the oscillator 162. The phase detector 158, the filter 160 and the oscillator 162 comprise a phase-locked loop 172, the operation of which loop is well known. The detector 158 outputs a signal to the filter 160 having an amplitude proportional to a difference in phase between the input signal on line 86 and an output signal of the oscillator 162. The filter 160 integrates the output signal of the detector 158 to provide a smoothly varying signal on line 170 for driving the oscillator 162. The bandwidth of the filter 160 is set in a well-known fashion to allow the loop 172 to follow the frequency of the audio tone line 86 as the tone frequency jumps between lower and higher frequencies. The higher tone frequency represents a logic-1 signal and the lower tone frequency represents a logic-0 signal for the transmission of display data.

It is noted that the frqquency control signal on line 170 increases in amplitude to provide the higher output frequency of the oscillator 162, and decreases in amplitude to provide the lower output frequency of the oscillator 162. The signal on line 170 is applied to one input terminal of the comparator 164, a reference signal from the source 166 being applied to a second input terminal of the comparator. The magnitude of the reference signal lies between the two amplitude values of the signal on line 170. The comparator 164 outputs a logic-1 signal in response to a high output voltage on line 170, and outputs a logic-0 signal on line 168 in response to a low output voltage of the signal on 170. Thereby, the demodulator 76 converts the audio tone FSK signals on line 86 to digital signals on line 168. A digital transmission rate of, for example, 545 baud is employed in the preferred embodiment of the invention.

Figure 6:
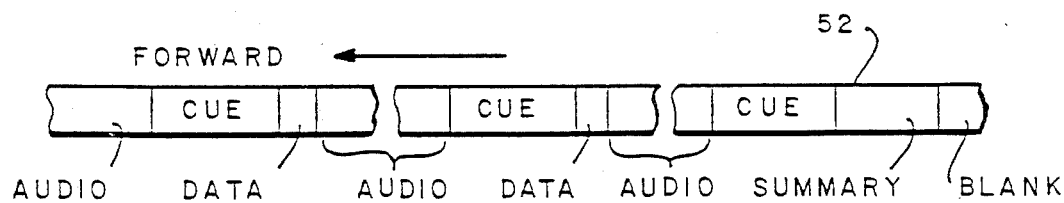
FIG. 6 shows an arrangement of regions of recorded audio signals and recorded display data signals on a recording tape.
Figure 9B:
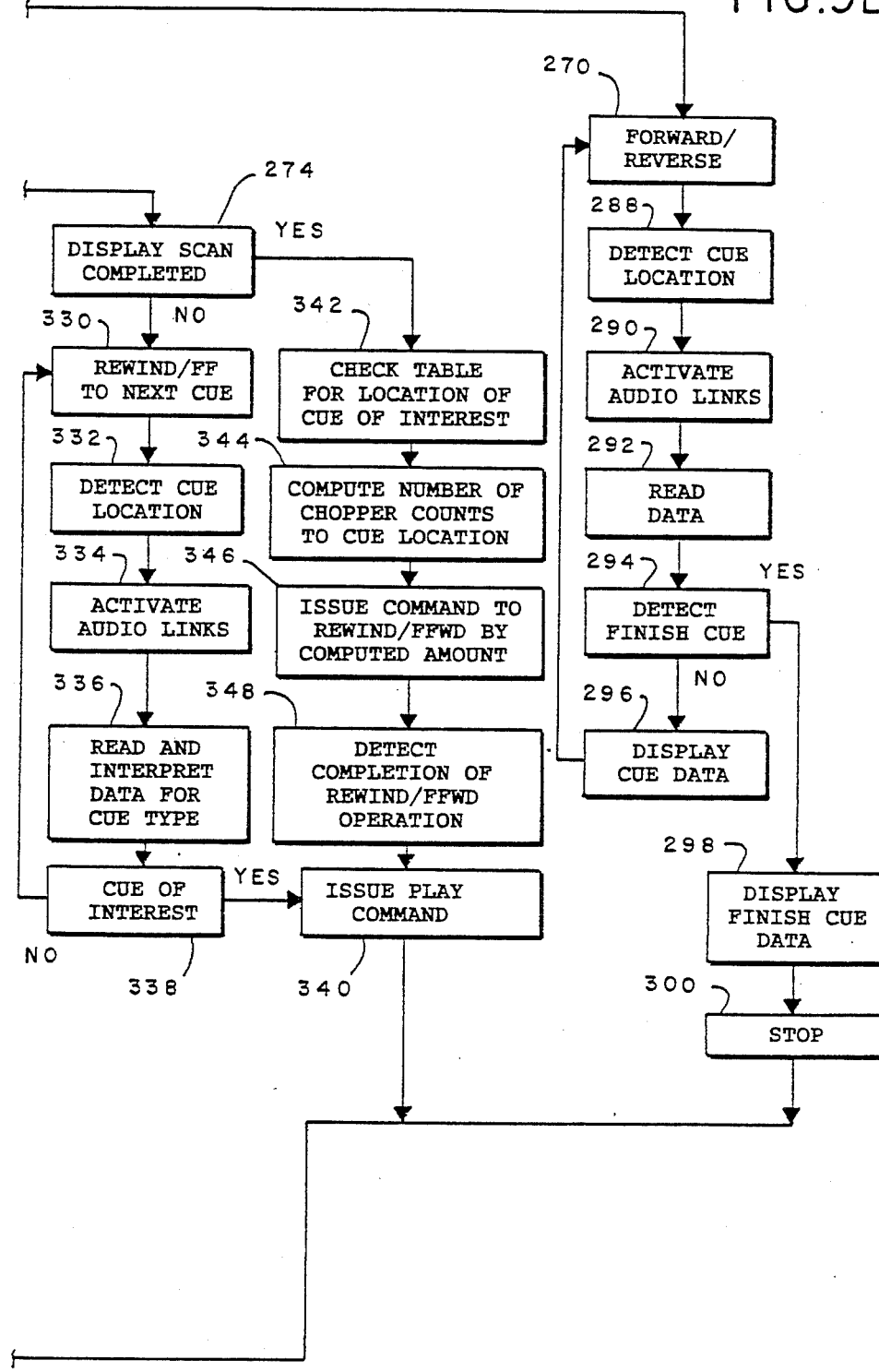

FIG. 6 shows diagrammatically a section of the recording tape 52. Portions of the tape carry recorded audio signals, while other portions of the tape carry recorded display data for operation of the display 24 of the display module 22. While an audio portion of the tape 52 may be relatively long, extending possibly through almost the entire length of the tape, the message-related display data portion is relatively short.

The forward direction of tape movement in FIG. 6 is toward the left. It is seen that the display data is recorded in a "cue block" after the corresponding audio portion so as to include information as to the length of that audio portion. The operator signifies his conclusion of the dictation of a message (e.g., end of letter) by operating a cue button to record a cue signal, which signal is recorded as a 15 Hz signal (for example) on a region of the tape between the end of the audio passage and the beginning of the corresponding cue block display data portion.

During fast-forward and fast-reverse movement of the tape 52, the 15 Hz cue tone appears as much higher frequency (in the range of 150–450 Hz) due to the rapid motion of the tape. Nevertheless, the length of the recorded portion of the cue tone is sufficient to allow the record/playback module 10 to detect the cue tone during fast-forward and fast-reverse movement so as to enable the drive 46 to stop the tape.

The cue tone may be comprised of a single burst of the 15 Hz signal, a "single-shot" cue tone, or may be comprised of two bursts of the 15 Hz signal, a "two-shot" cue tone. Each such burst of the 15 Hz signal is comprised of approximately 16 cycles of a 15 Hz square wave signal produced by oscillator 176. Thus it may be seen that each burst has a duration of approximately one second. The "two-shot" type of cue tone is comprised of two such bursts separated by approximately one half second of silence.

In accordance with an embodiment of the invention, following each cue tone is recorded digital data in the form of a "block" of information (referred to as a "cue block"), which is organized as a plurality of data words, or bytes, each of which bytes is eight bits in length. The cue block data contains information related to the recorded message, such as its length, type, time of recording, identity of the author who recorded it, and location of the message along with the recording tape. Referring now to FIG. 7 a portion of the tape 52 of FIG. 6 is shown. As can be seen at the left side of the tape 52 of FIG. 7, a final portion of an audio message is shown. The audio message may be a dictated letter, or a "priority" letter. Following the audio portion is a segment of silence, the length of which is determined by the time delay between the end of spoken dictation and the time at which the dictator depresses the cue button 13 on hand-held microphone 12. Depression of the cue button 13 causes microprocessor 64 to record the cue tone as has been previously described.

In addition, depression of the cue button 13 causes microprocessor 78 within display module 22 to record, by way of tone modulator 74, the aforementioned cue block. As may be seen in FIG. 7, the cue block preferably has a certain specific format whereby the bytes of data are organized into groups, or fields. The preferred ordering of the fields and the bytes within each field is as follows:

Following the cue tone is a length of blank tape providing approximately one half second of silence followed by a capture leader field. The capture leader field is comprised of a continuous mark signal (a "mark" corresponds to a logic-1) having a duration of 150 bit intervals. Each such bit interval is defined to be approximately 1.8 milliseconds, thus the capture leader field has a duration of approximately 275 milliseconds.

Following the capture leader field is a sync leader field comprised of 35 bit intervals of alternating mark and space signals (a "space" corresponds to a logic-0), thereby having a duration of approximately 64 milliseconds. The sync leader field begins with a space and ends with a space. Thus, it may be seen that the sync leader field has a leading space followed by 17 pairs of mark and space signals.

Although the capture leader and sync leader fields comprise a portion of the data block, they do not convey information related to the dictated message. Instead, the purpose of these two fields is to permit microprocessor 78, during playback to detect and synchronize to the bit stream of the data fields which follow. The absence of the capture leader and sync leader fields following a cue tone is indicative to microprocessor 78 that the tape was not recorded upon a modular dictation/transcription device of the present invention, but instead, that the tape was recorded upon, for example, the aforementioned DCX II or DCX III type device. Thus, a mechanism is provided for enabling "backwards compatibility" with earlier types of dictation/transcription devices which also employ cue tones, but do not provide an associated cue block of digital data. Such "backwards compatibility" is an important feature in that it allows an operator who uses an earlier device to continue to use that device in conjunction with a dictation/transcription system which embodies the method and system of the present invention.

As an example, if dictation had been recorded upon a DCX III device, the recorded messages would be accompanied by single and/or double burst of cue tones to identify the messages as being either letters or instructions. If such a dictated tape is played back for transcription in a system embodying the present invention, microprocessor 78 determines, after detecting two consecutive cue tones without a cue block, that the tape was recorded upon a DCX-type device. Thus, message identification would be made solely by the type of cue tones provided with the messages, i.e., single or double burst cue tones.

Alternatively, if a DCX III device is used to transcribe a tape which had been recorded in a system embodying the present invention, the cue information relating to message type can, nevertheless, be detected and displayed. The types of recorded messages, however, would be limited to letters and instructions since the DCX III device does not have circuitry operable for playing back or interpreting the FSK modulated data of the cue block. Hence, the DCX III device would be unaware of the presence of the cue block but would detect the single or double burst cue tones to identify whether the recorded messages are letters or instructions.

Continuing with the description of FIG. 7, it may be seen that following the sync leader field are a plurality of data fields which contain data relating to the audio message with which they are associated (e.g., data representing message type, length, location, etc.) Each of the plurality of data fields is comprised of either two or four bytes of data. To permit each byte to be read without error, four bits of each byte are dedicated to ensuring the data integrity of the byte. The remaining four bits are utilized to convey data. Thus, for every two bytes within a data field, one full byte of data (8 bits) is conveyed. The ordering and significance of the bits within a byte is as follows:

Bit 1 is defined to be a start bit, and is recorded as a mark. Bits 2, 3, and 4 are the first three bits of data, with Bit 2 being defined as the most significant bit (MSB) of the four bits. Bit 5 is a synchronization bit and is defined to have a value opposite that of Bit 4. For example, if Bit 4 is recorded as a mark, Bit 5 is correspondingly recorded as a space. The use of Bit 5 as a synchronization bit permits microprocessor 78 to verify approximately midway through the reading of each byte that it is still in synchronization with the bit stream. Bit 6 is the fourth and least significant bit (LSB) of data. Bit 7 is a parity bit, the value of which is selected during recording such that the number of mark bits within each byte is an even number, thereby further allowing microprocessor 78, during playback, to verify the data integrity of each byte. Bit 8 is defined to be a stop bit, and is recorded as a saace.

A plurality of such bytes in succession, in addition to the aforementioned capture leader and sync leader fields, comprise the cue block. It is appreciated that a cue block is recorded in response to the activation of the cue switch. In this embodiment of the present invention, the number of bytes comprising a cue block is 26. The 26 bytes are further differentiated into the following fields:

Field 1 is comprised of four bytes and is known as the Data Block Size field. The value contained within this field represents the total number of bytes, including those within the Data Block Size field, which make up the cue block. For example, the Data Block Size field for a cue block has a value of 26. As will be described below, this value differs when the recorded data represents a summary data block.

Field 2 is comprised of two bytes and is known as the Cue Type field. In this embodiment of the invention the Cue Type field of a cue block may have a value of either one, two, three or four for identifying the preceding cue tone and associated message as being either a letter, "priority" letter, instruction or "special" note, respectively. As has been previously described, the cue tone may be of the single or double burst type. Thus, these two cue types may be further differentiated into four cue types by the value of the data contained within the Cue Type field. In this embodiment of the invention, a single burst cue tone whose Cue Type field has a value of one is defined as a letter cue, while a single burst cue tone whose Cue Type field has a value of two is defined as a "priority" letter. In addition, a double burst cue tone whose Cue Type field has a value of three is defined as an instruction, while a double burst cue tone whose Cue Type field has a value of four is defined as a "special" note. As may be appreciated, the use of single and double burst cue tone allows for "backwards compatibility" with other dictation/transcription devices which also utilize single or double burst cue tones to differentiate between, for example, letters and instructions. As may be further appreciated, the use of the Cue Type field in conjunction with a cue tone provides for the differentiation of a single cue into more than four distinct types, for example 256 distinct types, as the Cue Type field has eight data bits. Thus, a potentially large number of different message types may be recognized by a dictation/transcription system employing the present invention.

Fields 3, 4, 5, and 6 are each comprised of two bytes and are known as the Hour, Minute, Day and Month fields, respectively. The values to be assigned to these fields are determined by microprocessor 78 from the current time and date when the cue button is depressed (it is assumed that the correct time and date will have been previously entered into display module 22 by the use of the mode button 106 and the select button 108, as has been described above).

Field 7 is comprised of four bytes and is defined as the Author I.D. field. This field has a value which corresponds to the value entered by the use of the mode button 106 and the select button 108 when entering the author identification information, as has been described above.

Field 8 is comprised of four bytes and is known as the Chopper Location field. The value of this field is expressed in hexadecimal and may vary from 0000 to FFFF, depending on the current value of the chopper count when the cue button is depressed. Normally, the value of the Chopper Location field is indicative of the position upon tape 52 of the recorded message. As may be appreciated, the value contained within the Chopper Location field is useful when it is desired to quickly position the tape 52 to a specific recorded message, as is done during transcription when the system is operating in a CUE SEARCH mode, as will be described below.

The final data field of a cue block is Field 9 and is the Beginning Chopper Location field. Field 9 has a length of four bytes, which bytes contain a hexadecimal value corresponding to the initial chopper count value when dictation is initiated upon tape 52. Thus, it may be seen that the value of Field 9 is useful, in conjunction with the value contained within Field 8, in determining both the relative position and the length, or duration, of a dictated message.

In the preferred embodiment of the invention there also is recorded on tape 52 a finish data block that follows the last cue block recorded thereon. The finish data block is generated by microprocessor 78 in response to a depression of the finish cue button 72a which normally is operated to indicate the end of a session of dictation. During a session of dictation the dictator may record a variety of messages such as letters and "priority" letters, at the completion of each of which the depression of the appropriate cue button causes a cue block to be recorded, as has been described above. In addition to the recording of each cue block, microprocessor 78 retains a copy of each cue block within memory 80. The depression of the finish cue button 72a directs microprocessor 78 to generate and record the finish data block (which is analogous to the aforementioned cue data block) followed by a summary data block. The summary data block contains information relating to all of the cue blocks previously recorded. The format of the finish data block is as follows:

A single burst cue, Capture Leader field and Sync Leader field are recorded as shown in FIG. 7. Next a Data Block Size field is recorded which contains a value represented by the expression (26+(22 x n)) wherein is equal to the number of cue blocks previously recorded on tape 52, and 22 equals the number of bytes required to represent each such cue block in the summary data block. The number of bytes needed to represent each cue block included in the summary data block is 22 and not 26 because the four byte Data Block Size field is not recorded for each summarized cue block. The number 26 in the above expression refers to the number of bytes contained within the finish data block. Thus, the Data Block Size field has a value which indicates the total number of data bytes for both the finish and summary data blocks.

Field 2 of the finish data block, the Cue Type Field, represents the alphanumeric characters "AA" to indicate that the data block is a finish data block and not a cue block.

The remaining Fields, namely 3 through 9, represent the same type of information that is represented by Fields 3 though 9 of the aforedescribed cue block, namely hour, minute, day, month, author I.D., chopper location, and beginning chopper location.

Following Field 9 of a finish data block is recorded a summary data block which is comprised of all of the cue blocks previously recorded on tape 52. The final cue block so recorded will be the cue block of the last dictated message, that is, the message dictated immediately preceding the depression of the Finish Cue button 72a.

Following the summary data block is recorded three seconds of blank data record, or silence, in order to permit the tape 52 to be positioned at a later time for additional dictation. Without such a blank data record the tape might be mispositioned such that the beginning of a new dictated message might be recorded over a portion of a previous summary data block.

As an example of the use of the cue blocks and the summary data block for providing information useful in the transcription of material from a previously recorded tape cassette, an operator such as a dictator or a transcriptionist may command the display module 22 to present the above-described bar graph display of the previously recorded messages as follows: After insertion of a previously recorded cassette, the operator pushes the "display" button 72b on the keyboard 26 of the display module 22. This activates the microprocessor 78 to read the information provided in the summary data block of the tape 52 for presenting the information on the display 24. The tape 52 is then scanned in either forward or rewind directions, depending upon whether forward search button 110 or rewind search pushbutton 112 is actuated, to read the stored information from the cue blocks of tape 52 into the microprocessor 78. If the "display" pushbutton is actuated, the summary data block is read first, and the entire display can be presented immediately, otherwise the display is generated piecemeal as the display data of each cue block is read. The operator selects the scan direction for accessing the summary data block by, for example, a "press-release" operation of pushbutton 72B to establish the rewind direction, or a "press-hold" operation to establish the forward direction. During the scanning, the finish cue signal preceding the summary data block or end of message cue signal preceding each cue block is detected by a detector 178 (FIG. 3), the detector 178 outputting a control signal via the interface unit 66 to the microprocessor 64.

During rewind scan, the microprocessor 64 responds by directing the drive 46 to stop the tape when a 15 Hz cue signal is detected, after which the tape is played in the forward direction. This brings the summary data block or a cue block past the head 54 for communication via the audio link to the tone demodulator 76 and to the microprocessor 78. During forward scan, the tape is advanced in the fast forward mode and is brought to a halt in response to the detection of a cue signal. In view of the fact that the tape may overshoot the cue signal position and, consequently, miss a part or all of the following display data portion, the microprocessor 64 is programmed to automatically command a back-up of the tape transport by a preset amount which brings the head 54 behind the display data portion. Thereupon, the tape advances in the forward direction and the display data is played back to be outputted to the microprocessor 78 of the display module 22. Thereafter, the microprocessor 78 commands the transport to advance further in the forward direction to accumulate data of other ones of the cue blocks of the tape 52, and finally to accumulate all of the display data in the summary data block. In this way, information relating to the messages recorded on a tape cassette is presented to the modules 10 and 22.

The tape motion pulses generated by reel rotation detector 60 are employed by the microprocessor 78 for positioning the segments of the bar graph presentation. The nonlinear relationship between reel rotation and tape advance may be converted to a linear relationship by microprocessor 78 which employs a linearization procedure of the type described in U.S. Pat. No. 4,410,923, assigned to the assignee of the present invention, resulting in a substantially linear presentation on the display 24. The tape motion pulses are transmitted over the bus 88 under control of the microprocessor 64.

FIG. 8 is a flow chart of the overall function of microprocessor 64 including a main loop 210 which branches to block 226 to begin the interaction between the display module 22 and the recording/playback module 10. Block 226 represents that the microprocessor of the module 10 looks for a command from the display module 22. If no command is received, the operation reverts to the main loop 210. If a display scan (block 228) command is received from the display module 22, the operation shown in FIG. 8 continues to block 230 wherein the module 10 detects whether the cue signal scanning is to be accomplished in the forward or reverse (rewind) direction of movement of the recording tape 52, depending upon the operation of the "display" pushbutton. If no display scan command from display module 22 is detected, the operation proceeds to block 236 to detect a cue search command, wherein the module 10 operates the tape transport to search the recording tape 52 for a cue signal.

At block 230, the module 10 searches tape 52 in the selected forward or the rewind direction for a cue signal. When a cue signal is detected (block 238) the tape drive 46 stops the movement of the tape 52, and the audio link is activated by operation of the switches 90 and 92 (block 240) for coupling signals played back from the tape 52 to the display module 22. The tape transport is operated to playback display data (block 242) from the cue block of the tape 52 to the display module 22. Playback continues until the end of the cue block (block 244). Module 10 then again receives a forward/reverse command (block 246) and activates the tape transport to search for the next cue signal. The cycle is repeated upon return to block 238 wherein the module 10 attempts to find the next cue block of the tape 52 containing display data.

With reference again to block 244, if the end of a cue block is not sensed but, rather, the end of summary data (recorded in a summary data block) is present, this end of the summary data block is detected at 248. The tape 52 continues to move past the head 54 until all of the summary data block is read from the tape for transference to the display module 22. Thereupon, the module 10 detects a stop command (block 250) indicating the end of the summary data block, at which point the tape drive 46 is stopped and operation reverts to the main loop at block 210.

If the command from the display module is neither a display scan command nor a cue search command, the received command may be a cue record command. Upon detection of a cue record command, module 10 implements the procedure for the recording of a cue block or a summary data block previously accumulated within the memory 80 of the display module 22. This data includes the locations of the start point of the first message (usually the beginning of tape) and the end points of each message dictated on the tape, as well as message characterizing signals (such as a letter, "priority" letter, an "instruction" or a "special" note, all of which are displayed by respective, distinctive displays). Also included are the identification of the author, the date, and the time of recording. If a display scan command (block 228 is not detected, the module 10 begins the procedure of transferring this information from the memory 80 of display module 22 to the cue block or to the summary data block of the recording tape 52. The procedure is implemented by activating the audio link 82 and record circuit 56 (of FIG. 3) at block 252, provided that a cue search command (block 236) is not received, but a cue record command (block 232) is detected. The sequence of recorded information begins with the recording of the cue signal (block 254) this being followed by the recording of the display data (block 256). The recording process stops upon detecting a stop command (block 258) from the display module 22, indicating that all of the display data has been read from memory 80. Thereafter, the operation reverts to the main loop 210.

With reference to block 236, if the command from the display module 22 is a cue search command to find a cue block on the recording tape 52, this is implemented by the detection in block 260 of a forward or reverse tape movement command (e.g., a forward search or a rewind search command). Thereafter, at block 262, the module 10 may be provided with a command to advance to a specific location or to a specific type of message on the recording tape. If no such command is given, the transport continues to advance the tape in either the forward or reverse direction until a cue signal is detected at block 264. Thereupon, playback of the cue block (or, alternatively, the summary data block) commences as indicated at block 266. If, at block 262, a specific location is designated, then the drive 46 moves the tape 52 by either fast forward or fast rewind to the designated location after which playback (block 266) commences and the operation reverts to the main loop at block 210.

During the interaction between the recording/playback module 10 and the display module 22, both the microprocessor 64 of the module 10 and the microprocessor 78 of the display module 22 operate to provide the functions of data storage and display. The operation of the microprocessor 64, during this interaction, has been described in the flow chart of FIG. 8. The operation of the microprocessor 78, during this interaction, will now be described in conjunction with FIG. 9.

As shown on FIG. 9, the operation begins with the detection of a display scan request at block 268, which request is initiated by an operator pushing the button 72B of display module 22. Detection is ahieved after completion of the procedure of the main loop. If the display scan request is detected, the operation proceeds to block 270 to supply either a forward tape drive command or a reverse command to module 10, depending upon the operation of pushbutton 72B, as mentioned above. In the event that no request for a display scan is detected, the operation proceeds to block 272 for detection of a search request. Such request is made by pushing the Forward Search 110 or Rewind Search 112 buttons. The cue select button 102 of the display module 22 is used in conjunction with the FORWARD SEARCH or the REWIND SEARCH buttons to access, for example, the next "priority" letter, or the next instruction, or the next "special" note. In the event that such request is received, the operation proceeds to block 274 to sense whether a previously requested display scan operation has been completed. In the event that no request for a cue search is detected at block 272, the operation proceeds to block 276 wherein the display module 22 attempts to detect if pushbutton 72A has been operated to initiate a finish request. If a finish request has been detected, the operation proceeds to block 278 to sense if module 10 is in its dictate or transcribe mode. If the former operation continues to block 280 and if the latter to block 282. In the event that no finish request is detected at block 276, the operation proceeds to block 284 for the detection of a cue signal record command, generated by the operation of the cue pushbuttons on microphone 12. If such a cue record command is detected from the module 10, the operation of the module 22 proceeds to block 286 to detect an end-of-cue command. In the event that a cue signal is not to be recorded, the microprocessor returns from block 284 to the main loop 210.

With reference to the block 270, in response to a display scan request, microprocessor 78 commands microprocessor 64 to advance the recording tape 52 for detection of a cue at block 288. Thereupon, at block 290, the audio link is activated by switches 92 and 90 to couple data between the tape 52 and the display module 22. The reading of data is indicated at block 292, which reading continues until the detection of a finish cue data block at block 294. If no finish cue data block is detected, the data read out of the sensed cue block recorded on the tape 52 is displayed at block 296, after which the operation reverts to block 270 for continued advancement of the recording tape to the next cue position. If, at block 294, a finish cue is detected, the summary data block is displayed as indicated at block 298, and the data reading process stops at block 300 whereupon the operation reverts to the main loop at block 210. It will be appreciated that the display is as follows: the length of a letter or "priority" letter is indicated by the number of successive segments energized in display 24, and a letter is represented by steady state energized segments whereas a "priority" letter is represented by flashing segments. A instruction is indicated by energizing the particular segment in a separate array to represent the location of that instruction. A "special" note is indicated in a manner similar to that for an instruction, but the segment is flashed.

With reference to blocks 272 and 274, in the event that a request to search for a desired cue type has been made, microprocessor 78 determines if a previously requested display scan operation has been performed. If a display scan has been completed, the operation advances to block 342 to extract the tape count information from the table of cue blocks that had been stored in memory 80. At block 344 microprocessor 78 computes the required number of motion pulse counts that should be accumulated in order to move tape 52 from its current position to the position of the desired cue type. At block 346 microprocessor 78 issues a command to microprocessor 64 to move tape 52 by the required number of pulse counts. Microprocessor 78 then pauses at block 348 until the repositioning of tape 52 is complete, at which time the tape is played back for reproduction of the recorded message, as indicated by block 340. Thereupon, the operation reverts to the main loop at block 210.

If, at block 274, microprocessor 78 determines that a display scan operation has not been completed, or has not been requested, the operation advances to block 330 in which the tape 52 is advanced in a forward or reverse direction, in accordance with the search request selected by the operator, to reach the next cue block. When a cue tone is detected, microprocessor 78 activates the audio links at block 334 and reads and interprets the cue block at block 336. If it is determined from the Cue Type field of this cue block that a desired cue type has been reached, that is, if a letter, "priority" letter, instruction or "special" note has been selected and the Cue Type field which is read matches the selected type, as at block 338, the operation continues to block 340 in order to play the message. If at block 338 it is determined that the cue which has been reached is not the desired cue type, the operation reverts to block 330 for advancement to the next cue.

As may be appreciated from the above description of the operation of microprocessor 78 following a cue search request, several advantages are obtained by the present invention. Firstly, if a display scan request has been previously performed, the table of cue blocks built up thereby in memory 80 provides a rapid means to position the tape at a desired type of message. Secondly, a transcriptionist may rapidly differentiate between selected message types. As an example, a transcriptionist might first select the cue for "priority" letters and, by the cue search request, locate and transcribe all such "priority" letters on the tape. Next, the transcriptionist might select the cue for letters, and similarly transcribe all letters on the tape.

With reference to blocks 276 and 278, upon detection of a finish request during dictation microprocessor 78 commands microprocessor 64 to terminate the dictation process and advance the tape by fast forward (block 280) to the furthest advance point of dictated material. Thereupon, at block 308, the audio link is activated followed by detection of the end-of-cue command at block 310. This provides the site on the tape wherein the finish and summary data blocks are to be written. At block 312 the summary data block describing usage of the recording tape, which data had been stored in the memory 80, is coupled via the audio link for recording on the tape 52. Upon completion of the recording of the summary data block, the audio links are closed (block 314) after which the operation reverts to the main loop 210.

In the event that the finish request (block 276) is detected during a transcribe operation, the display 24 extinguishes the set of display segments representing the message which has just been transcribed or, alternatively, if those segments and others had been extinguished, the finish request re-energizes those segments. The extinguished segments leave a space in the bar graph display which indicates to the transcriptionist those messages that have been transcribed. Block 282 determines if the finish button 72A is pushed for less than one-half second, whereupon the microprocessor extinguishes the segments that define a particular message. If the finish button is pushed and held for more than one-half second, the microprocessor reenergizes all of the segments which had previously been extinguished. Thereafter, operation reverts to the main loop 210.

With reference to blocks 284 and 286 for the detection of a cue record command during a dictate operation, the end of the cue record command is detected at block 286 followed by activation of the audio link at block 320. Thereafter, the cue block associated with the message is supplied from microprocessor 78 to module 10 for recording as a cue block on the tape 52, as indicated at block 322. At the conclusion of the recording of the cue block, the audio links are closed at block 324, and the operation reverts to the main loop 210.

It is to be understood that the above-described embodiment of the invention is illustrative only and that modification thereof may occur to those skilled in the art. Accordingly, this invention is not to be regarded as being limited to the embodiment disclosed herein, but is to be limited only as defined by the appended claims.

What is claimed is:

1. A method of recording identifying signals to identify types of audio messages recorded on an audio record medium comprising the steps of:
   selectively generating one of at least two different types of analog identifying signals to identify at least two different types of audio messages;
   creating a block of digital data including digital identifying signals; and
   recording the generating identifying signals and said block of digital data on said audio record medium.

2. A method according to claim 1 wherein said identifying signals are tone signals one of which is comprised of a single burst of tone signal and another of which is comprised of a double burst of tone signal.

3. The method of claim 2 wherein said tone signals are of equal frequency.

4. A method according to claim 1 wherein said block of digital data is comprised of a plurality of digital data fields, at least one of said fields representing the type of audio message recorded on said record medium.

5. A method according to claim 4 wherein others of said digital data fields represent one or more of time and date of recording of said audio message, identification of an author of said audio message, and location of said audio message on said record medium.

6. A method according to claim 1 wherein said step of recording said block of digital data comprises converting said digital data to analog signal frequencies for recording on said record medium.

7. A method according to claim 6 wherein the step of converting comprising FSK modulation.

8. The method of claim 1 wherein said identifying signal and said block of digital data are recorded immediately downstream of an audio message on said record medium.

9. The method of claim 1 wherein said identifying signal and said block of digital data are recorded immediately upstream of an audio message on said record medium.

10. A method of displaying the types and locations of audio messages recorded on a record medium, and wherein at least one of two different types of analog identifying signals and blocks of digital data which identify said messages also are recorded on said record medium proximate the audio messages identified thereby, said method comprising the steps of:
scanning said record medium;
reading said digital data from said record medium in response to detection of said analog identifying signals; and
displaying visual indications of the type and location of respective messages in response to the digital data read from said record medium.

11. A method according oo claim 10 wherein said identifying signals are tone signals one of which is comprised of one burst of tone signal and another of which is comprised of two bursts of tone signal.

12. A method according to claim 10 wherein said block of digital data is comprised of a plurality of digital data fields, at least one of said fields representing the type of audio message recorded on said record medium.

13. A method according to claim 12 wherein others of said digital data fields represent one or more of time and date of recording of said audio message, identification of an author of said audio message, and location of said audio message on said record medium.

14. A method according to claim 10 wherein said blocks of digital data are provided on said record medium in FSK format, and wherein the step of reading comprises converting said FSK format to digital format.

15. A dictation system for recording messages and message identifying signals on a record medium, comprising:
recording means for recording messages and identifying signals on said record meidum;
identifying signal generating means selectively operable to generate at least two different types of analog identifying signals to identify at least two different types of messages;
digital data block generating means operable when said identifying signal generating means is operated to generate a data block of digital indentifying signals for providing further identification of respective messages; and
supply means for supplying both the generated analog identifying signal and the generated data block to said recording means for recording on said record medium.

16. The system of claim 15 wherein said identifying signal generating means comprises tone signal generating means selectively operable to generate a single burst of tone signal or a double burst of tone signal.

17. The system of claim 15 wherein an identifying signal and a data block are recorded proximate the audio message identified thereby.

18. The system of claim 17 wherein an identifying signal of one type and a data block are recorded after the end of an audio message.

19. The system of claim 18 wherein an identifying signal of another type and a data block are recorded at the beginning of an audio message.

20. The system of claim 17 wherein said data block is comprised of a plurality of digital data fields, at least one of said fields representing the type of message recorded on said record medium.

21. The system of claim 20 wherein others of said digital data fields represent one or more of time and date of recording of said message, identification of an author of said message, and location of said message on said record medium.

22. The system of claim 15 wherein said supply means comprises modulator means coupled to said digital data block generating means for modulating an analog signal with said data block for recording on said record medium by said recording means.

23. The system of claim 22 wherein said modulator means comprises an FSK modulator.

24. The system of claim 15 wherein said at least two types of messages comprise letters and instructions.

25. The system of claim 24 wherein said letters include two different tyees of letters and wherein said instructions include two different types of instructions.

26. The system of claim 15 further comprising manual means operable by a user of said sytem to initiate operation of said identifying signal generating means and said digital data block generating means.

27. The system of claim 26 further including memory means for storing each data block that is generated in response to the operation of said manual means; finish switch means manually operable to cause the stored data blocks to be applied to said supply means as a summary data block and to initiate operation of said identifying signal generating means to generate a signal identifying said summary data block; and means for causing said digital data block generating means to generate a data block which identifies said summary data block.

28. The system of claim 27 wherein said summary data block is applied to said supply means after the last-mentioned data block is applied thereto.

29. a transcription system for playing back messages and analog identifying signals serving to identify at least two different types of messages, from recorded media, and blocks of digital identifying data that provides further identification of the respective messages accompanying said identifying signals on selected ones of said record media, said system comprising:
scanning means for scanning the record medium for identifying signals and for data blocks;
read means for reading said data blocks, if present, from said record media;
display means for displaying visual message identifying information in response to the digital identifying data read from said record media;
detecting means for detecting said identifying signals on said record media; and
means for controlling said display means in response to detected identifying signals if data blocks are not present on said record media.

30. The system of claim 29 wherein said identifying signals are tone signals selectively comprised of a single or double burst of tone signal.

31. The system of claim 30 wherein said identifying signals are recorded proximate respective messages and, if present, said data blocks also are recorded proximate respective messages.

32. The system of claim 29 wherein each block of digital identifying data is comprised of a plurality of digital data fields, at least one of said fields representing the type of message recorded on said record medium.

33. The system of claim 32 wherein others of said digital data fields represent one or more of time and date of recording of said message, identification of an author of said message, and location of said message on said record medium.

34. The system of claim 29 wherein said data blocks are recorded as modulated signals and said read means includes demodulator means for recovering digital signals from the modulated data block signals.

35. The system of claim 34 wherein said modulated signals are FSK signals and said demodulator means comprises an FSK demodulator.

36. The system of claim 29 wherein said record medium also may have optionally recorded thereon a summary data block that provides further identification of each of the recorded messages, said summary data block being recorded downstream of all of the messages on said record medium; wherein said read means is additionally operative to read said summary data block from said record medium; and further comprising means for controlling said display means in response to the summary data block read from said record medium.

37. A modular dictation system comprising:

a dictation module having recording means for recording messages on a recording medium, identifying signal generating means selectively operable to generate at least two different types of analog identifying signals to identify at least two different types of messages, digital data block generating means is operated to generate a data block of digital identifying signals for providing further identification of respective messages, and means for supplying both the identifying signals and the data blocks to said recording means; and a physically independent display module connectable to said dictation module to form an integral structure therewith and having visual indicator means responsive at least to said data blocks for providing visual indications of the types of recorded messages.

38. A modular transcription system comprising:

a transcribe module having playback means for playing back from a record medium messages analog identifying signals which identify at least two different types of messages and data blocks of digital identifying data that provide further identification of the respective messages; and a physically independently display module connectable to said transcribe module to form an integral structure therewith and having display means for displaying visual message identifying information in response to the digital identifying data played back from said record medium, and means for controlling said displaying means in response to identifying signals played back from said record medium if data blocks are not present.

* * * * *